(12) United States Patent
Lovell

(10) Patent No.: US 11,536,393 B2
(45) Date of Patent: Dec. 27, 2022

(54) TRAVEL FEEDBACK SYSTEM

(71) Applicant: FISHER CONTROLS INTERNATIONAL LLC, Marshalltown, IA (US)

(72) Inventor: Michel K. Lovell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 79 days.

(21) Appl. No.: 17/228,262

(22) Filed: Apr. 12, 2021

(65) Prior Publication Data

US 2022/0325822 A1 Oct. 13, 2022

(51) Int. Cl.
*F16K 37/00* (2006.01)
*F16K 31/00* (2006.01)
*F16K 31/524* (2006.01)
*F16K 31/528* (2006.01)

(52) U.S. Cl.
CPC ...... *F16K 37/0041* (2013.01); *F16K 31/5286* (2013.01); *F16K 31/52475* (2013.01)

(58) Field of Classification Search
CPC ........... F16K 31/0041; F16K 31/52475; F16K 31/5286
See application file for complete search history.

(56) References Cited

U.S. PATENT DOCUMENTS

| 4,011,891 | A | * | 3/1977 | Knutson | .............. F15B 9/08 |
| | | | | | 137/625.62 |
| 4,374,654 | A | * | 2/1983 | McCoy | .............. C01B 3/34 |
| | | | | | 423/230 |
| 4,574,651 | A | * | 3/1986 | Nordstrom | .............. G05G 1/01 |
| | | | | | 244/234 |
| 6,481,463 | B1 | * | 11/2002 | Harms | .............. F15B 9/10 |
| | | | | | 137/625.65 |
| 6,909,281 | B2 | | 6/2005 | Gassman et al. | |
| 7,283,886 | B1 | * | 10/2007 | Bowman | .............. G05B 19/07 |
| | | | | | 700/83 |
| 7,609,056 | B2 | | 10/2009 | Junk et al. | |
| 11,353,120 | B2 | * | 6/2022 | Apperger | .............. F16K 3/246 |

(Continued)

OTHER PUBLICATIONS

STI Brochure, Model MC: Motion Converter.

(Continued)

*Primary Examiner* — Kevin R Barss
(74) *Attorney, Agent, or Firm* — Marshall, Gerstein & Borun LLP

(57) ABSTRACT

A linear feedback travel assembly includes a first tube end, a second tube end, and a longitudinal axis. A drive rod includes a first end and a second end, and a cam includes a first end, a second end, and a wall defining a bore, a first slot, and a second slot. The cam is movable along, and rotatable about, the longitudinal axis. A first pin is movably disposed in the first slot of the cam and is fixed relative to the first tube end. A second pin is movably disposed in the second slot of the cam and connects the drive rod to the cam. When the cam moves along the longitudinal axis, the first pin moves within the first slot and rotates the cam about the longitudinal axis. The second pin rotates the drive rod as the second pin moves within the second slot of the cam.

20 Claims, 12 Drawing Sheets

(56) References Cited

U.S. PATENT DOCUMENTS

| | | | | |
|---|---|---|---|---|
| 2013/0171590 A1* | 7/2013 | Kumar | ............... | G09B 19/167 |
| | | | | 434/62 |
| 2019/0128269 A1* | 5/2019 | Gottschalk | ............. | F02D 29/00 |
| 2020/0223556 A1* | 7/2020 | Zweig | ................... | C08K 3/346 |

OTHER PUBLICATIONS

Emerson Fisher FieldVue DVC6000 Digital Valve Controller, Instruction Manual, Sep. 2018.
Emerson Fisher FieldVue DVC6200 Digital Valve Controller, Product Bulletin, Sep. 2017.
Emerson Fisher 585C Series Piston Actuators, Instruction Manual, Apr. 2019.
Emerson Fisher Optimized Anti-surge Control Valves, Brochure, 2019.
FlowServe Valtek Compressor Anti-Surge Valve, Technical Bulletin, Aug. 2020.

\* cited by examiner

FIG. 7A  FIG. 7B  FIG. 7C

TRAVEL FEEDBACK SYSTEM

FIELD OF DISCLOSURE

The present disclosure relates to a travel feedback system, and more particularly, to a linear travel feedback system.

BACKGROUND

Industrial processing plants use control valves in a wide variety of applications such as, for example, controlling product flow in a food processing plant, maintaining fluid levels in large tank farms, etc. Automated control valves are used to manage the product flow or to maintain the fluid levels by functioning like a variable passage. The amount of fluid flowing through a valve body of the automated control valve can be accurately controlled by precise movement of a valve member. The control valve or its valve member may be accurately controlled via an actuator and a remotely operated instrument or valve controller, which communicates with a process control computer or unit to receive commands from the process control unit and position the valve member to change the fluid flow through the control valve. Typically, a position sensor within the control valve assembly facilitates accurate positioning of the valve member and, thus, accurate process control.

A digital valve controller uses a magnet-based non-contacting travel feedback for positioning the valve member of a control valve. In one example, a digital valve controller includes linear magnet arrays to measure actuator travels as long as eight inches. For larger control valves that have travels in excess of eight inches, a cam is used to scale the magnet travel down to a manageable value. However, cams used in these situations are susceptible to large vibrations. Often times, to reinforce the linear cams against vibrations, heavy material is added to the cam, thereby adding weight to the entire system, and increasing difficulty in assembly. These cams are also susceptible to the large impact force of the valve member contacting a seat ring. Again, material weight is added to prevent shifting of the cam and inaccuracies in positioning actuator travel. Installation of these cams is also difficult to manage as the specific angle, height, and throw of a roller of the cam must be precisely controlled. All of these adjustments to bolster the cam can be time consuming and oftentimes field maintenance invalidates original factory cam adjustment.

SUMMARY

A linear feedback travel system of the present disclosure accurately measures travel distances of a linear actuator. The system includes a linear actuator, a transducer, a digital valve controller, and a mounting assembly. The transducer converts linear input from an actuator to rotational output that is delivered to a positioner, such as a digital valve controller. The disclosure facilitates install in harsh weather conditions, and allows for inaccuracies in alignment and rotation when installing without affecting the accuracy of the transducer.

In a first exemplary aspect, a linear feedback travel assembly may include a first tube end, a second tube end opposite the first tube end, and a longitudinal axis. A drive rod may include a first end disposed proximal to the first tube end, and a second end opposite the first end. A cam may include a first end, a second end opposite the first end and disposed within the second tube end, and a wall defining a bore, a first slot, and a second slot. The bore may be sized to slidably receive the drive rod. The cam may be movable along the longitudinal axis and rotatable about the longitudinal axis when the second tube end receives a linear input from an actuator. A first pin may be movably disposed in the first slot of the cam. The first pin may be fixed relative to the first tube end. A second pin may be movably disposed in the second slot of the cam and connecting the second end of the drive rod to the cam. When the cam linearly moves along the longitudinal axis, the first pin may move within the first slot of the cam and may rotate the cam about the longitudinal axis. The second pin may rotate the drive rod as the second pin moves within the second slot of the cam.

In a second exemplary aspect, a linear travel feedback system may include a transducer having a first end and a second end opposite the first end. The transducer may include a drive rod and a cam coaxially aligned relative to a longitudinal axis of the transducer. The drive rod may include a first end proximal to the first end of the transducer and a second end opposite the first end. The cam may include a first end and a second end opposite the first end. The second end of the cam may be coupled to the second end of the transducer. A first mounting assembly may be arranged to couple the first end of the transducer to an actuator housing. A second mounting assembly may be arranged to couple the second end of the transducer to a stem so that the second mounting assembly is movable with the stem. The transducer may be movable between a compressed position, in which the second end of the drive rod is proximally located relative to the second end of the cam, and an extended position, in which the second end of the drive rod is spaced from the second end of the cam.

In a third exemplary aspect, a method of determining linear travel of an actuator may include mounting a first end of a transducer to an actuator housing of an actuator assembly. The transducer may include a cam, a drive rod, a first pin coupled to a spiral slot in the cam, and a second pin coupling the drive rod to a linear slot of the cam. The drive rod and cam may be aligned with a longitudinal axis of the transducer. The method may include mounting a second end, opposite the first end, of the transducer to a stem connected to the actuator assembly. The stem may be movable relative to the actuator housing in a linear direction. The transducer may be movable with the stem between a compressed configuration and an extended configuration along the longitudinal axis. The method may include coupling a digital valve controller to the transducer, and receiving, via the second end of the transducer, a linear input from the stem when the stem moves a distance in the linear direction. The second end of the transducer may be coupled to the cam. The method may include transferring the linear input from the stem to the cam. The cam may be axially movable along the longitudinal axis. The method may further include converting the linear input of the stem to a rotational output of the cam. The first pin may rotate the cam about the longitudinal axis when the cam moves linearly along the longitudinal axis. The method may include receiving, via the drive rod, the rotational output of the cam, and converting the rotational output of the cam to a rotational output of the drive rod. The second pin may rotate the drive rod about the longitudinal axis when the second pin moves relative to the linear slot of the cam. Finally, the method may include receiving, via the digital valve controller, the rotational output of the drive rod, and measuring the distance of the stem using the rotational output of the drive rod.

In accordance with any one of the first, second, and third exemplary aspects, the linear feedback travel assembly and system and method of determining linear travel of an actuator may include any one or more of the following preferred forms.

In a preferred form, the first slot may be a spiral slot.

In a preferred form, the second slot may be a linear slot.

In a preferred form, a first mounting assembly may be coupled to the first tube end.

In a preferred form, the first mounting assembly may be arranged to couple a housing of an actuator assembly to the first tube end.

In a preferred form, a second mounting assembly may be coupled to the second tube end.

In a preferred form, the second mounting assembly may be arranged to couple a stem coupled to the actuator to the second tube end so that the second mounting assembly is movable in a linear direction with the stem.

In a preferred form, the second mounting assembly may include a ball joint coupled to the second tube end.

In a preferred form, a damper may be disposed adjacent to the ball joint.

In a preferred form, a first telescoping tube may be slidably coupled to a second telescoping tube.

In a preferred form, the first telescoping tube may be coupled to the first tube end.

In a preferred form, the second telescoping tube may be coupled to the second tube end.

In a preferred form, a guide tube may be mounted to the first telescoping tube.

In a preferred form, the first pin may extend from the guide tube and into the first slot of the cam.

In a preferred form, a digital valve controller may be coupled to the first end of the drive rod to receive a rotational output of the drive rod.

In a preferred form, a bellows may have a first end sealably coupled to the first tube end.

In a preferred form, the bellows may have a second end sealably coupled to the second tube end.

In a preferred form, the cam may be rotatable about the longitudinal axis.

In a preferred form, the cam may be linearly movable along the longitudinal axis as the transducer moves between the compressed position and the extended position.

In a preferred form, the cam may be movable relative to the drive rod.

In a preferred form, the cam may include a wall defining a bore, a spiral slot, and a linear slot.

In a preferred form, the bore may be sized to slidably receive the drive rod.

In a preferred form, a first pin may be movably disposed in the spiral slot of the cam.

In a preferred from, the first pin may be fixed relative to the first end of the transducer.

In a preferred form, a second pin may be movably disposed in the linear slot of the cam.

In a preferred form, the second pin may connect the second end of the drive rod to the cam.

In a preferred form, the assembly or system may include a first telescoping tube and a second telescoping tube.

In a preferred form, the second telescoping tube may be movable relative to the first telescoping tube.

In a preferred form, the second telescoping tube may be movable along the longitudinal axis when the transducer moves between the compressed position and the extended position.

In a preferred form, the first mounting assembly may include a tube bracket and a pin bracket coupled to the tube bracket.

In a preferred form, the tube bracket may be coupled to the first end of the transducer.

In a preferred form, the pin bracket may be arranged to couple the tube bracket to a yoke of the actuator assembly.

In a preferred form, a digital valve controller may be coupled to the first end of the drive rod to receive a rotational output of the drive rod.

In a preferred form, mounting a second end may include coupling a ball joint to a bracket and coupling the bracket to the stem.

DETAILED DESCRIPTION

Figure 1:
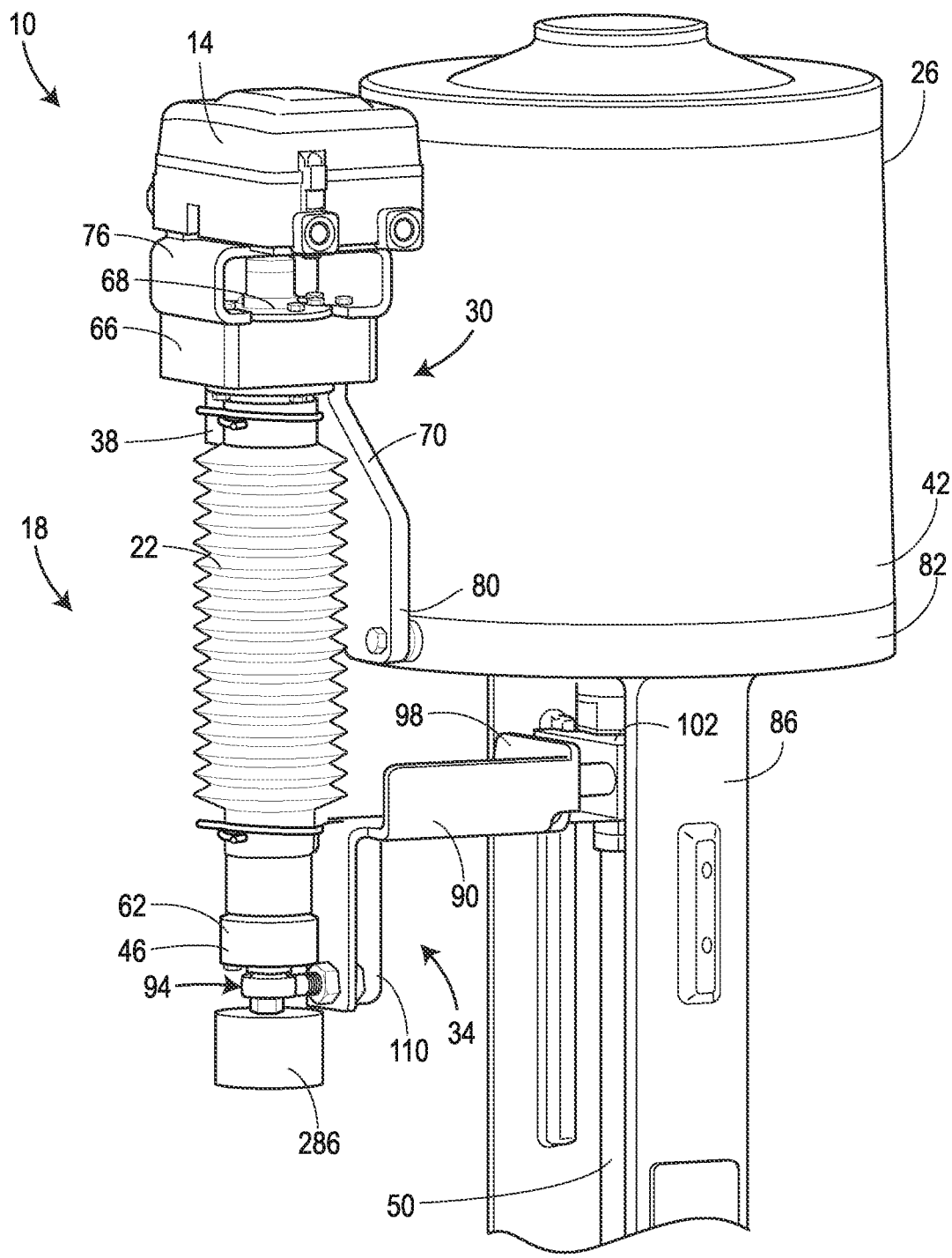
FIG. 1 is a perspective view of a first exemplary travel feedback system constructed in accordance with the teachings of the present disclosure, the travel feedback system including an actuator, a transducer in a compressed configuration, and a digital valve controller.

A linear feedback travel system 10 of FIG. 1 is constructed in accordance with the teachings of the present disclosure. The system 10 is a ruggedized linear-to-rotary motion converter that accurately measures actuator travel beyond eight inches. The system 10 includes a digital valve controller ("DVC") 14 coupled to a feedback travel assembly 18, which includes a transducer 22 mounted to an actuator assembly 26. The feedback travel assembly 18 receives a linear input from the actuator assembly 26 and converts the linear input into a rotational output received and measured by the DVC 14. The DVC 14 may be a single magnet that rotates +/−45 degrees to create a linear feedback signal, and the actuator assembly 26 may be a 585C piston actuator with eight inches of travel. However, the feedback travel assembly 18 disclosed herein may be adapted to mount to a variety of different positioners and actuators.

Figure 2A:
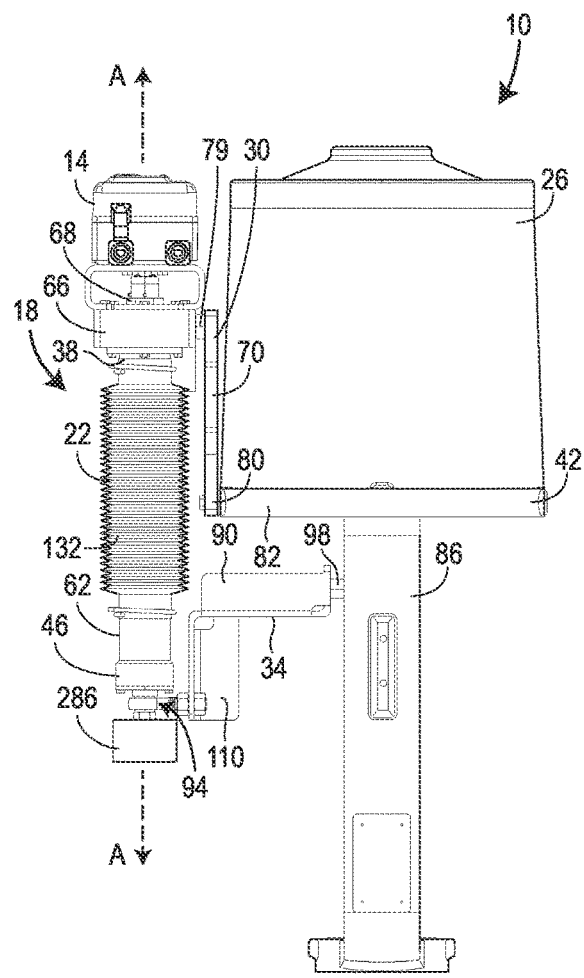
FIG. 2A is a front view of the travel feedback system of FIG. 1.
Figure 2B:
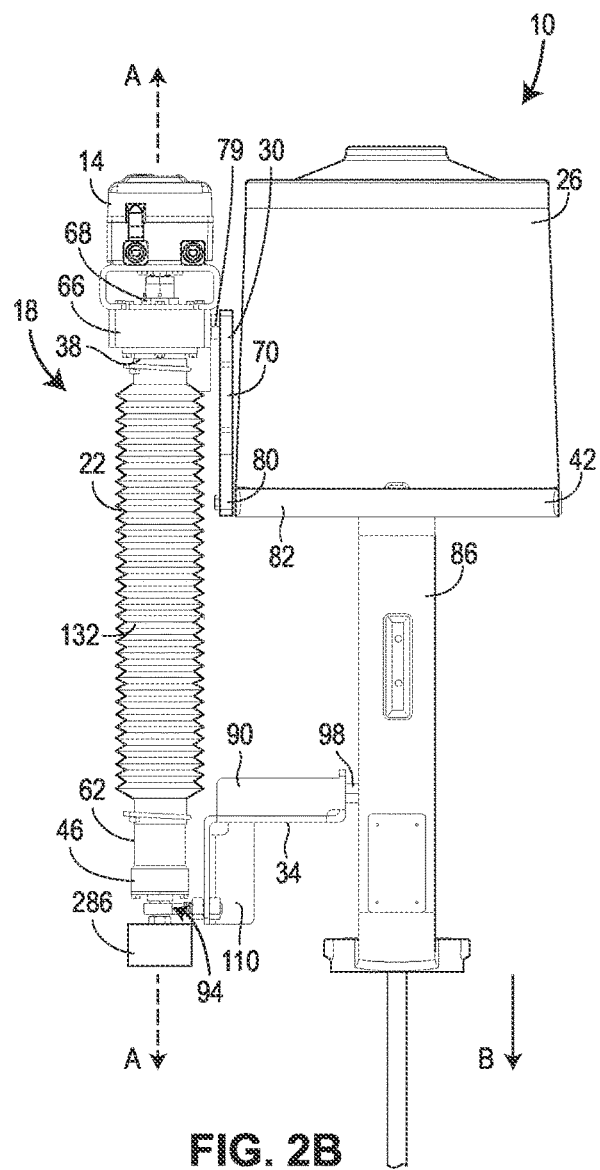
FIG. 2B is a front view of the travel feedback system of FIG. 1, showing the transducer in an extended configuration.

The feedback travel assembly 18 includes the transducer 22, a first mounting assembly 30, and a second mounting assembly 34. The first mounting assembly 30 couples a first end 38 of the transducer 22 to an actuator housing 42, and the second mounting assembly 34 couples a second end 46 of the transducer 22 to a stem 50 (e.g., such as a valve stem) of the actuator assembly 26. As the actuator assembly 26 moves (e.g., linear movement of a piston 54 and rod 50), the second end 46 of the transducer 22 also moves relative to the first end 38 because the second mounting assembly 34 is coupled to a movable component (i.e., stem 50) of the actuator assembly 26 and the first mounting assembly 30 is coupled to a relatively stationary component (i.e., actuator housing 42). The feedback travel assembly 18 moves between a compressed configuration, as shown in FIG. 2A, and an extended configuration, as shown in FIG. 2B. As shown in this side-by-side comparison, the transducer 22 extends linearly along a longitudinal axis A of the transducer 22 as the valve stem 50 moves in a linear direction B from an initial or first position (FIG. 2A) to a second position (FIG. 2B). The longitudinal axis A of the transducer 22 may be parallel with the linear direction B of the actuator assembly 26. However, the feedback travel assembly 18 accommodates slight inaccuracies of alignment relative to the actuator assembly 26, and therefore may not necessarily be parallel to the linear direction B.

Figure 3:
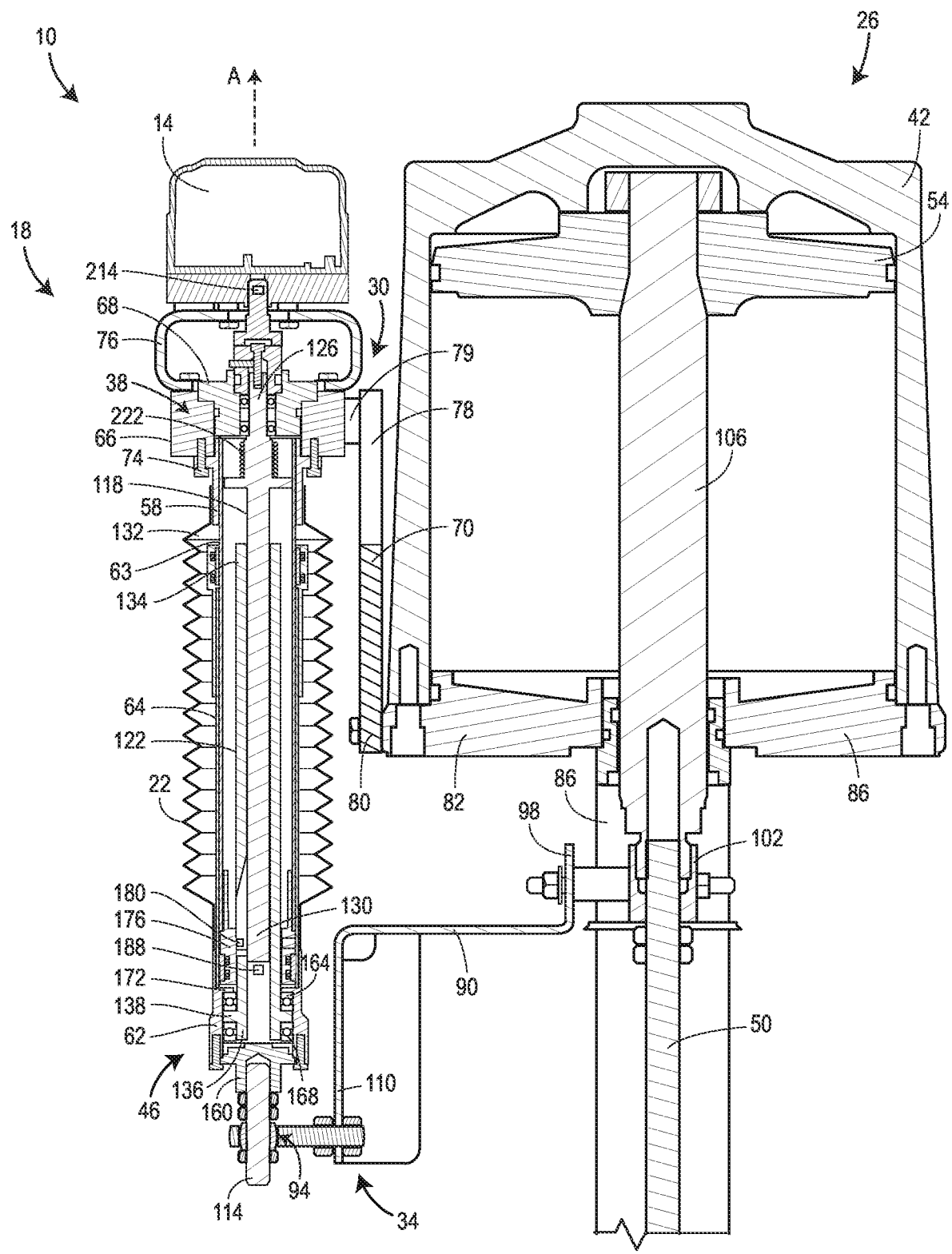
FIG. 3 is a cross-sectional view of the travel feedback system of FIG. 1.
Figure 4:
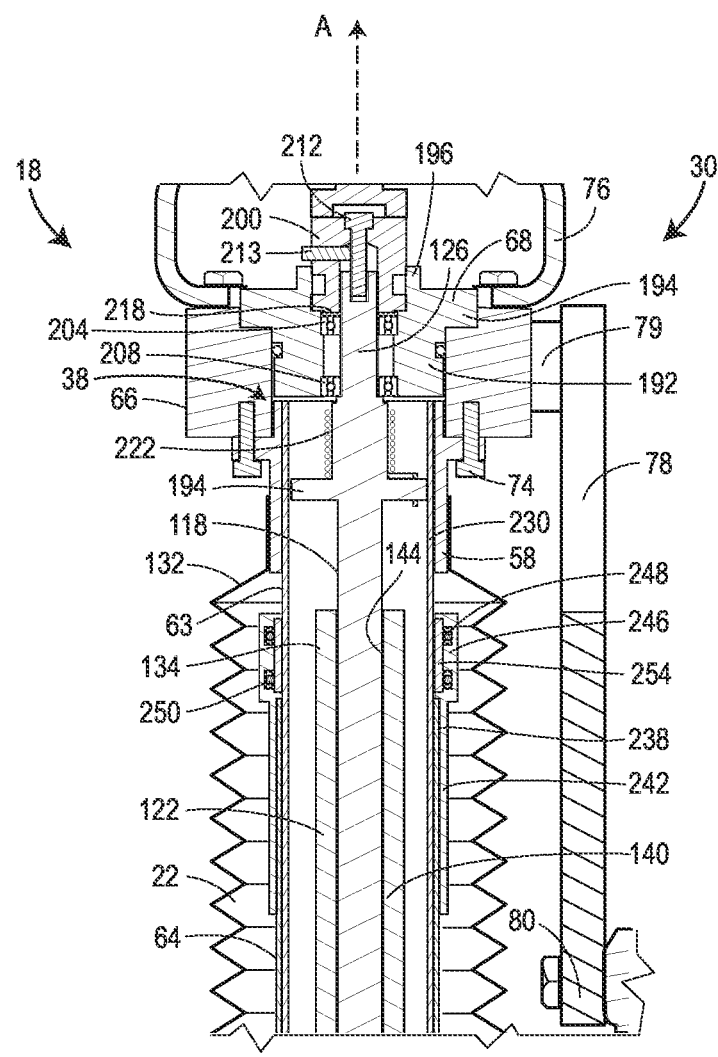
FIG. 4 is a magnified, partial cross-sectional view of a first end of the transducer of FIG. 3.
Figure 8:
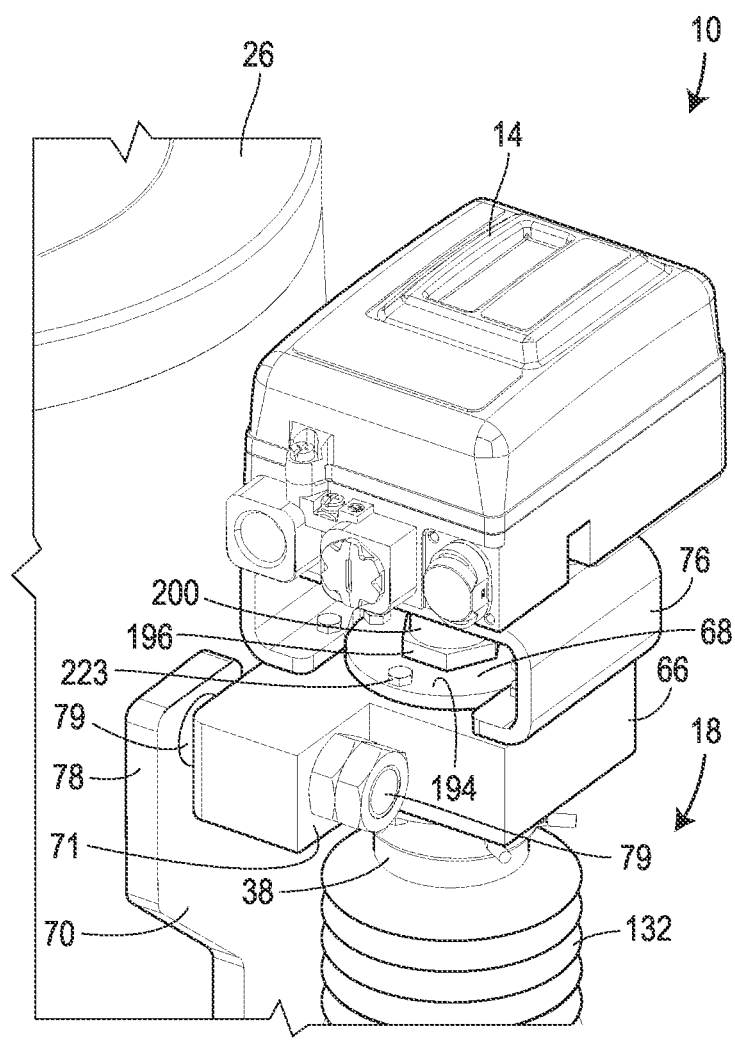
FIG. 8 is a partial, back perspective view of the travel feedback system of FIG. 1.

In FIGS. 3 and 4, the first mounting assembly 30 is coupled to a first tube end 58 of the first end 38 of the transducer 22, and the second mounting assembly 34 is coupled to a second tube end 62 of the second end 46 of the transducer 22. The first and second tube ends 58, 62 are coupled to first and second telescoping tubes 63, 64, respectively, which slide relative to each other when the feedback assembly 18 moves between the compressed and extended positions. The first mounting assembly 30 includes a tube bracket 66, a tube bracket cap 68, and pin bracket 70 coupled to the tube bracket 66. The tube bracket 66 is secured to the first tube end 58 of the transducer 22 by a plurality of fasteners 74, and constrains the transducer 22 in all directions except for rotation around the pin bolt 79. The bracket cap 68 is disposed within a bore of the tube bracket 66, and couples the transducer 22 to the DVC 14. A DVC mount 76 secures the DVC 14 to the tube bracket 66 by a plurality of fasteners. The pin bracket 70 includes a first portion 78 coupled to the tube bracket 66, and a second portion 80 fastened to the actuator housing 42. The first portion 78 includes a mounting bolt 79 that is secured to an aperture formed in the tube bracket 66 (FIG. 8). The second portion 80 of the pin bracket 70 is securely fastened to a flanged portion 82 of a yoke 86 of the actuator assembly 26. As will be described further below, the tube bracket 66 provides an adjustable feature, allowing different placements of the pin bracket 70 relative to the transducer 22 to minimize vibration of the system 10.

At the second end 46 of the transducer 22, the second mounting assembly 34 couples the valve stem 50 to the second tube end 62. The second mounting assembly 34 includes a bracket 90 and a ball joint 94 coupled to the bracket 90. In particular, a first end 98 of the bracket 90 is coupled to a stem connector assembly 102 of the actuator assembly 26, which securely couples an actuator stem 106 of the piston 54 to the valve stem 50. A second end 110 of the bracket 90 is secured to the ball joint 94, which is coupled to a mounting bolt 114 of the transducer 22. The ball joint 94 is arranged to permit lateral and tilting motion without causing damage or degrading the accuracy of the transducer 22 during installation and operation of system 10.

Together, the first and second mounting assemblies 30, 34 may be adapted to mount to a range of different valve and actuator styles, and can accommodate mounting errors such as misalignment, stem rotation, and tilting or cocking of the mounting brackets. As used herein, "stem" may refer to the valve stem 50, the actuator stem 106, or the actuator stem 106 and the valve stem 50 as a solitary unit. The stem 50 may be part of a connected valve (not illustrated) or part of the actuator assembly.

Figure 5:
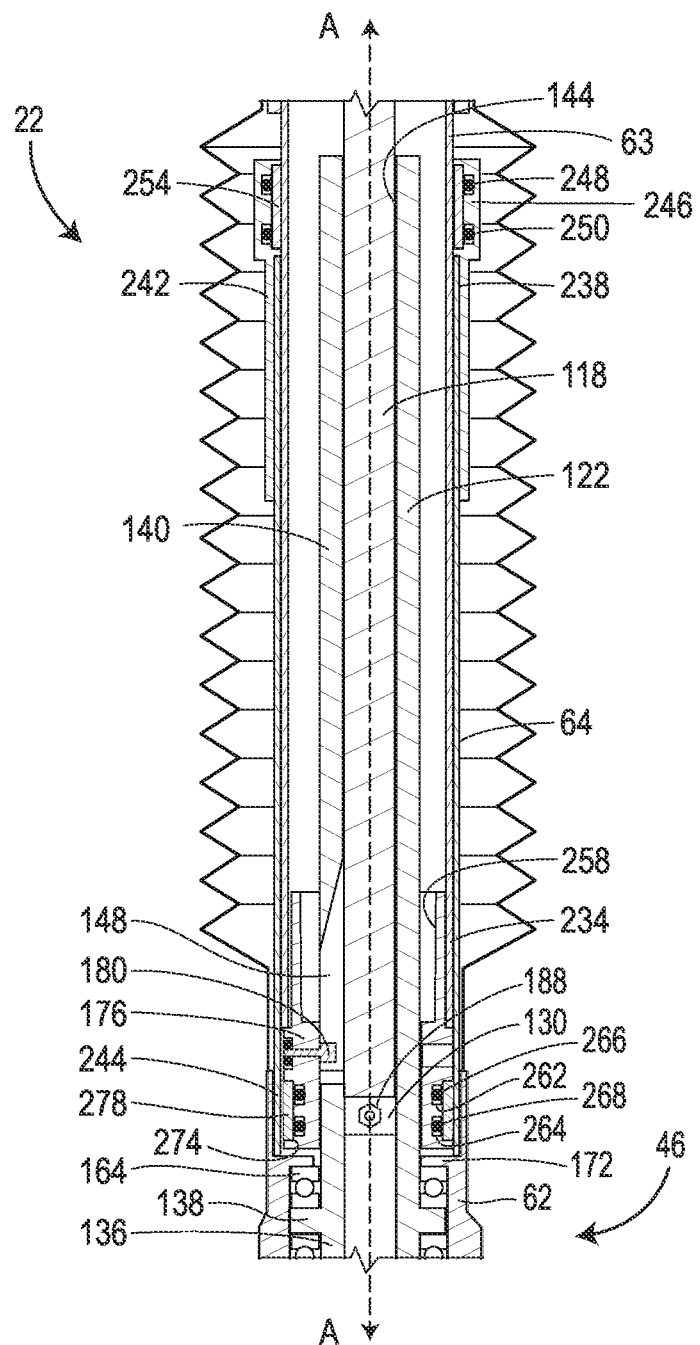
FIG. 5 is a magnified, partial cross-sectional view of a middle portion of the transducer of FIG. 3.

FIGS. 3-6 illustrate the transducer 22 of the feedback assembly 18 in the compressed configuration. The transducer 22 includes a drive rod 118 and a cam 122 arranged to convert a linear movement of the valve stem 50 to a rotational movement of the drive rod 118, which is then received by the DVC 14. The drive rod 118 includes a first end 126 proximal to the first tube end 58 and a second end 130 opposite the first end 126. As shown in FIG. 4, the first end 126 of the drive rod 118 extends through the bracket cap 68 and is indirectly coupled to the DVC 14. As shown in FIG. 5, the second end 130 of the drive rod 118 is coupled to the cam 122. The drive rod 118 is rotatable about the longitudinal axis A of the transducer 22, but does not move in a linear direction. In the compressed position, the second end 130 of the drive rod 118 is proximally located relative to the second end 46 of the transducer 22 (FIG. 5). A protective sleeve or bellows 132 sealingly contains the interior components of the transducer 22 from the surrounding environment, and compresses and expands as the feedback assembly 18 moves between the compressed and extended configurations. The bellows 132 is clamped to outer surfaces of the first tube end 58 and the second tube end 62 by removable clamps.

Turning briefly to FIGS. 7A-7C, the cam 122 includes a first end 134, a second end 136 opposite the first end 134, and a flange 138 at the second end 136. The cam 122 includes a generally cylindrical wall 140 defining a bore 144 (FIGS. 4-6) to slidably receive the drive rod 118, a first slot 148, and a second slot 152. The first slot 148, best shown in FIG. 7C, is a spiral slot extending from the first end 134 along a length of the cam 122 to a location C. The second slot 152, disposed generally opposite the spiral slot 148, is linear and extends from the first end 134 to a location D. The first and second slots 148, 152 of the cam 122 extend between different points of the cam 122, however, the longitudinal length of each slot 148, 152 may be substantially similar. The length of each slot 148, 152 may be altered to limit or extend the expansion of the transducer 22, and thereby accommodate different lengths of actuator travel. Both the first and second slots 148, 152 extend to a stepped portion 156 of the first end 134 of the cam 122. The stepped portion 156, as shown in FIGS. 7B and 7C, is milled in a step-like fashion to facilitate assembly and disassembly of the drive rod 118, the cam 122, and first and second cam pins 180, 188.

Figure 6:
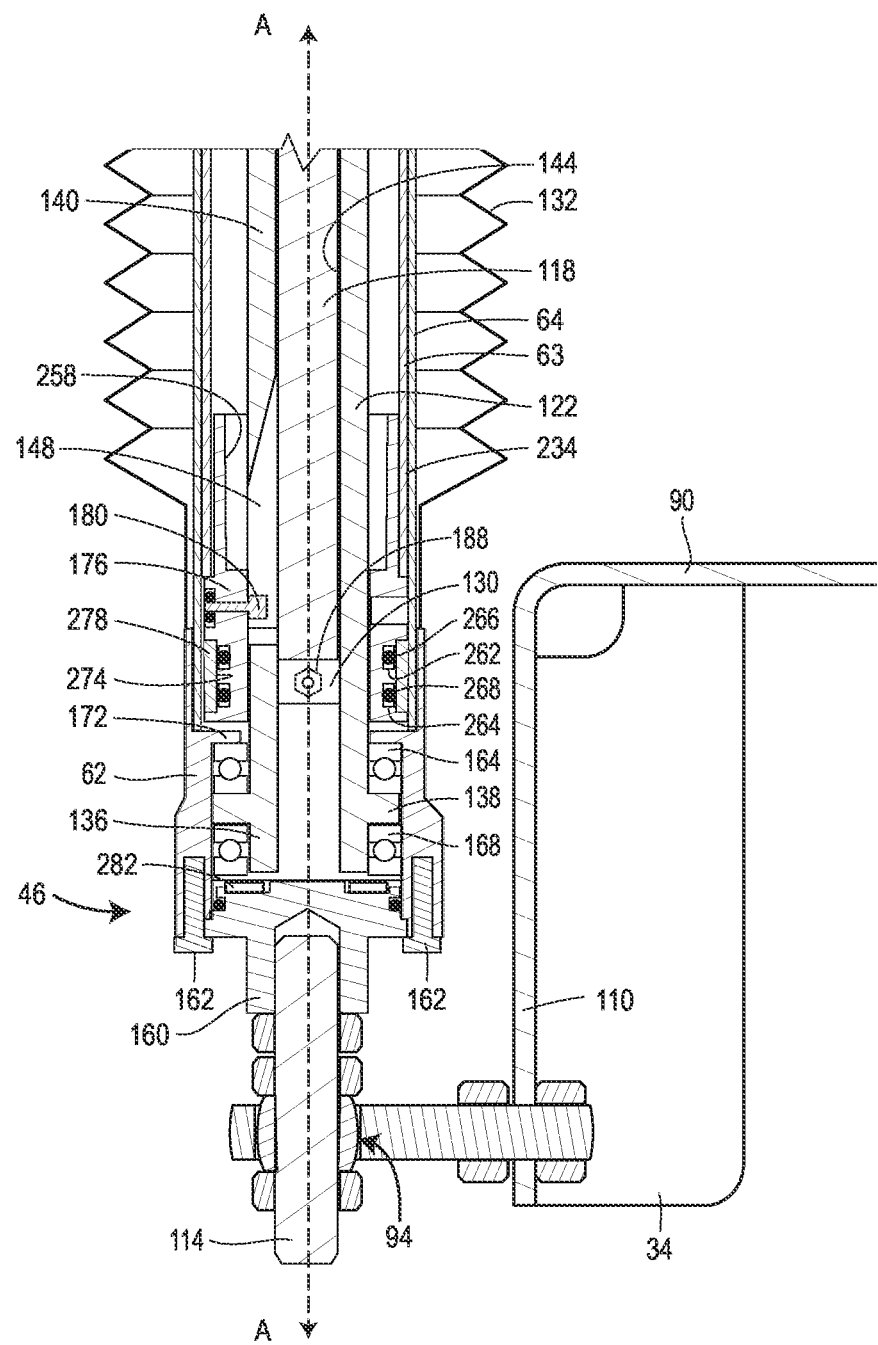
FIG. 6 is a magnified, partial cross-sectional view of a second end of the transducer of FIG. 3.
Figure 7:
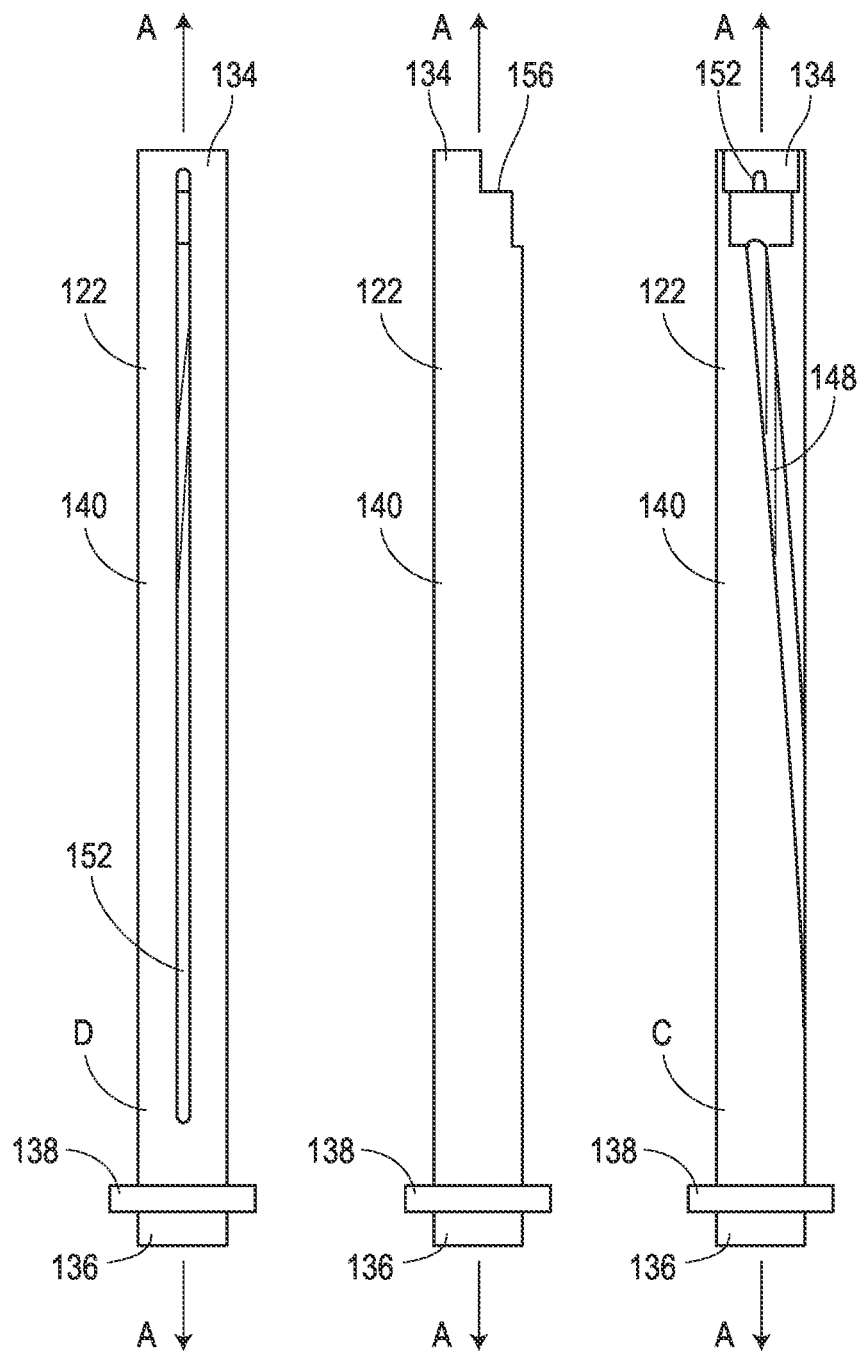
FIG. 7A is a first side view of a cam of the transducer of FIG. 1.
FIG. 7B is a front view of the cam of FIG. 7A.
FIG. 7C is a second side view of the cam of FIG. 7A.

Turning back to FIGS. 3, 5, and 6, the cam 122 is linearly movable along the longitudinal axis A and is rotatable about the longitudinal axis A when the transducer 22 receives a linear input from the actuator assembly 26. First, the cam 122 moves linearly by way of a connection with the second tube end 62. In particular, the cam 122 is secured to the second tube end 62 by a lower mounting cap 160 (FIG. 6). A plurality of fasteners 162 couple the lower mounting cap 160 to the second tube end 62, keeping the cam 122 from falling out of the transducer 22. The flange 138 of the cam 122 is mounted between first and second sets of bearings 164, 168, which securely hold the cam 122 between an internal flange 172 of the second tube end 62 and the mounting cap 160. As shown in FIG. 6, the mounting bolt 114 extends through the ball joint 94 of the second mounting assembly 34 and is secured to the mounting cap 160. As such, as the valve stem 50 moves in the linear direction, the cam 122 also moves in a linear direction and along the longitudinal axis A. The first and second sets of bearings secure the cam 122 to the second tube end 62, while permitting the cam 122 to rotate relative to the second tube end 62. This arrangement also permits the mounting bolt 114 to rotate freely without changing the position of a feedback magnet of the DVC 14.

Second, the cam 122 is rotatable about the longitudinal axis A by its connection to a an inner tube guide 176 and first pin 180. The first pin 180 is movably disposed in the first slot 148 of the cam 122 and is fixed relative to the first tube end 58 of the transducer 22. In particular, the first pin 180 is secured to the inner tube guide 176 and extends from an interior wall of the inner tube guide 176 into the spiral slot 148 of the cam 122. The inner tube guide 176 is fixed to the first telescoping tube 63 of the transducer 22 so that the inner tube guide 176 and first pin 180 do not rotate relative to the longitudinal axis A with the movement of the cam 122. As such, when the cam 122 moves in the linear direction along axis A, the first pin 180 slides along the first spiral slot 148, forcing the cam 122 to rotate so that the first pin 180 can continue its travel within the spiral slot 148. In the illustrated example, the first pin 180 causes the cam 122 to rotates 90 degrees when the cam 122 translates linearly a distance equal to the rated travel of the transducer 22. However, in other examples, the cam 122 may be arranged to rotate less than 90 degrees or more than 90 degrees, depending on the geometry of the spiral slot 148.

Rotation of the cam 122 forces the drive rod 118 to rotate. A second pin 188 is movably disposed in the second slot 152 of the cam 122 and couples the drive rod 118 to the cam 122. Specifically, the second pin 188 is fixed to the second end 130 of the drive rod 118 and extends away from the drive rod 118 and into the linear slot 152 of the cam 122. As the cam 122 moves in the linear direction, the second pin 188 engages a side of the linear slot 152. Further, as the cam 122 rotates about the longitudinal axis A, as discussed above, the linear slot 152 forces the second pin 188 to travel within the linear slot 152, thereby forcing the second pin 188 to rotate about longitudinal axis A. Because the second pin 188 is fixed to the rod 118, the second pin 188 traveling within the linear slot 152 of the cam 122 forces the drive rod 118 to rotate about the longitudinal axis A. In operation, when the cam 122 moves linearly along the longitudinal axis A, the first pin 180 moves within the first slot 148 of the cam 122 and rotates the cam 122 about the longitudinal axis A, which forces the second pin 188 to move within the linear slot 152 and rotate with the rotation of the cam 122. This rotational motion of the cam 122 causes the drive rod 118 to also rotate about the longitudinal axis A, as well. The first and second pins 180, 188 may be stationary pins such that they do not rotate about their own axes, or they may be rotational pins (i.e., rollers) and therefore may rotate about their own axes. As used herein, the first and second pins 180, 188 may be described as "fixed" relative to other components. This term may be used to describe the relative movement of the pins relative to those components, and does not limit the pins to being stationary pins. Other exemplary pins besides rollers and stationary pins are possible as well. For example, the first and second pins 180, 188 may be integrally formed with the inner tube guide 176 and the drive rod 118, respectively.

Turning back to FIG. 4, the first mounting assembly 30 and first end 38 of the transducer 22 are illustrated in more detail. The DVC mount 76 secures the DVC 14 to the tube bracket 66 of the first mounting assembly 30. The tube bracket 66 includes a bore sized to receive the bracket cap 68 and the first tube end 58 of the transducer 22, opposite the bracket cap 68. The bracket cap 68 includes a lower annular portion 192, a radial flange 194, and a hexagonal collar 196. The hexagonal collar 196 extends away from the flange 194 of the bracket cap 68 and engages a mounting cap 200 of the transducer 22. The bore of the bracket cap 68 is sized to receive first and second bearings 204, 208, which are disposed around the first end 126 of the drive rod 118. The first and second bearings 204, 208 help maintain axial alignment of the drive rod 118 while permitting the drive rod 118 to rotate about the longitudinal axis A.

The drive rod 118 extends through the bracket cap 68 and into a blind bore of the mounting cap 200. A cap screw 212 secures the second end 126 of the drive rod 118 to the mounting cap 200, and the mounting cap 200 is coupled to a feedback magnet 214 (FIG. 3) of the DVC 14. In FIG. 4, a groove pin 213 is disposed through mounting cap 200 and into a slot formed in the first end 126 of the drive rod 118. The groove pin 213 ensures positive alignment with the magnet of the DVC 14. When the cap screw 212 is tightened, the groove pin 213 is secured in position in the slot of the drive rod 118.

In FIG. 3, the first end 126 of the drive rod 118 of the transducer 22 is secured to the mounting cap 200 by cap screw 212, sandwiching the disk spring 218 and bearings 204, 208 within the bracket cap 68. A disk spring 218 is disposed between the first set of bearings 204 and the mounting cap 200 and helps minimize lost motion in the linear direction. When the cap screw 212 tightens during assembly of the transducer 22, the mounting cap 200 compresses the disk spring 218, thereby loading the first bearing set 204 and clamping the drive rod 118 in place. This clamping force ensures the drive rod 118 will not shift linearly along the axis A during operation.

A torsion spring 222 is coupled to a flange 194 of the drive rod 118 and the bracket cap 68 to minimize unintentional rotation of the drive rod 118 and to reduce lost rotary motion of the transducer 22. The torsion spring 222 is adjustable by adjusting the hexagonal collar 196 of the bracket cap 68. The torsion spring 222 biases the drive rod 118 to ensure both the first and second pins 180, 188 remain in contact with the cam 122 at all times, thereby eliminating lost rotary motion. In other words, the torsion spring 222 biases the drive rod 118 in its engagement with the cam 122 so that any rotation of the drive rod 118 is preserved and is not lost moving the drive rod 118 between a width of the slots 148, 152 of the cam 122. The torsion spring 222 can be wound in either a first direction or a second opposite direction about the longitudinal axis A of the transducer 22 to extend the life of the cam 122. For example, in high wear applications, the first and second pins 180, 188 may wear on a particular side of each respective slot 148, 152 of the cam 122 during operation. To double the life of the cam 122, the torsion spring 222 may be reloaded and wound in an opposite direction so that the first and second pins 180, 188 wear on an opposite side of each respective slot 148, 152 of the cam 122.

Turning briefly to FIG. 8, to adjust or reverse the tension in the torsion spring 222, an operator may disengage and remove cap screws 223 bolting the radial flange 194 of the bracket cap 68 to the tube bracket 66. An operator may turn the hex collar 196 a desired amount in increments of 90 degrees to wind the torsion spring 222. This operation does not affect the zero or span of the transducer 22 and can be done without any further disassembly of the system 10. Also shown in FIG. 8, is a pin bolt 79 of the first mounting assembly 30 coupled to a component 71 of the tube bracket 66. Specifically, the pin bolt 79 extends through a bore perpendicularly oriented relative to the central bore of the tube bracket 66. The tube bracket 66 constrains the transducer in all directions except for rotation about the pin bolt 79.

In FIGS. 4-6, the transducer 22 is in the compressed position, and the telescoping tubes 63, 64 are in the completely collapsed position. As shown in FIG. 4, the first tube end 58 is coupled to a first end 230 of the first telescoping tube 63 of the transducer 22. The telescoping tubes 63, 64 are axially aligned with the transducer 22, and each of the tubes 63, 64 has a thin cylindrical wall. The second telescoping tube 64 has an inner diameter slightly larger than an outer diameter of the first telescoping tube 63 so that the second telescoping tube 64 slidably receives the cylindrical wall of the first telescoping tube 63. As shown in the compressed configuration of FIG. 5, a second end 234 of the first telescoping tube 63 is secured to the inner tube guide 176 and is proximal to the second end 46 of the transducer 22. When the transducer 22 moves from the compressed configuration to the expanded configuration, the first telescoping tube 63 remains stationary, whereas the second telescoping tube 64 slides relative to the first telescoping tube 63 along the longitudinal axis A of the transducer 22.

In FIGS. 4 and 5, a first end 238 of the second telescoping tube 64 is coupled to an outer tube guide 242, and as shown in FIGS. 5 and 6, a second end 244 of the second telescoping tube 64 is coupled to the second tube end 62. In FIGS. 4 and 5, the outer tube guide 242 includes a first portion 246 that clamps two O-rings 248, 250 and a guide sleeve 254 against the first telescoping tube 63. The outer tube guide 242 moves with the second telescoping tube 64 and slides against the first telescoping tube 63 when the second telescoping tube 64 moves relative to the first telescoping tube 63. As will be discussed further below, the outer tube guide 242 and the guide sleeve 254 help reinforce the rigidity of the transducer 22 and absorb vibration when the transducer 22 is in the extended position and more susceptible to vibration.

In FIGS. 5 and 6, the second end 234 of the first telescoping tube 63 is securely coupled to the inner tube guide 176. The inner tube guide 176 includes a bore 258, first and second grooves 262, 264, to receive first and second O-rings 266, 268, and a third groove 274 to receive a guide sleeve 278. The bore 258 has a first inner diameter sized to slidably receive the cam 122, and a second larger diameter to facilitate assembly of the transducer 22. The guide sleeve 278 is mounted between the second end 244 of the second telescoping tube 64 and the first and second O-rings 266, 268. Above the O-rings and guide sleeve (as shown in FIG. 6), the first pin 180 is secured to a wall of the inner tube guide 176 and extends into the bore 258 of the inner tube guide 176 and into the spiral slot 148 of the cam 122. The inner tube guide 176 is fixed to the second end 234 of the first telescoping tube 63.

In FIG. 6, a disk spring 282 is disposed between the lower mounting cap 160 and the second set of bearings 168. When the mounting cap 160 is installed, the disk spring 282 loads the lower bearing set 168, clamping the cam 122 in place. The installed clamping force ensures the lower mounting cap 160 does not shift linearly during operation, eliminating lost linear motion. The bellows clamp may be loosened and the second tube end 62 may be rotated independently of the cam 122 and the drive rod 118, which improves mounting convenience and protects the device from damage from wrench torque during installation.

Figure 9:
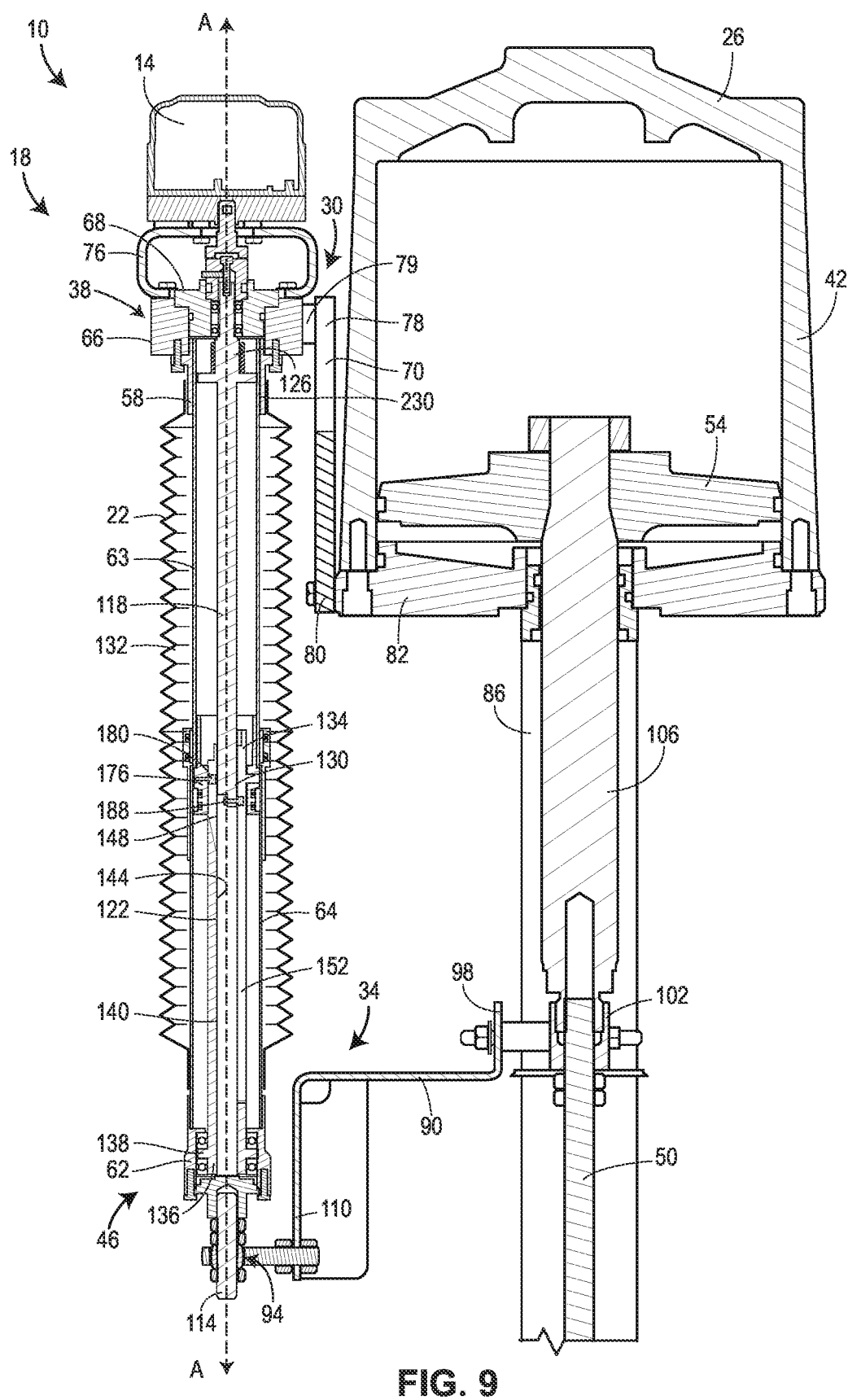
FIG. 9 is a cross-sectional view of the travel feedback system of FIG. 1, showing the transducer in the extended configuration.
Figure 10:
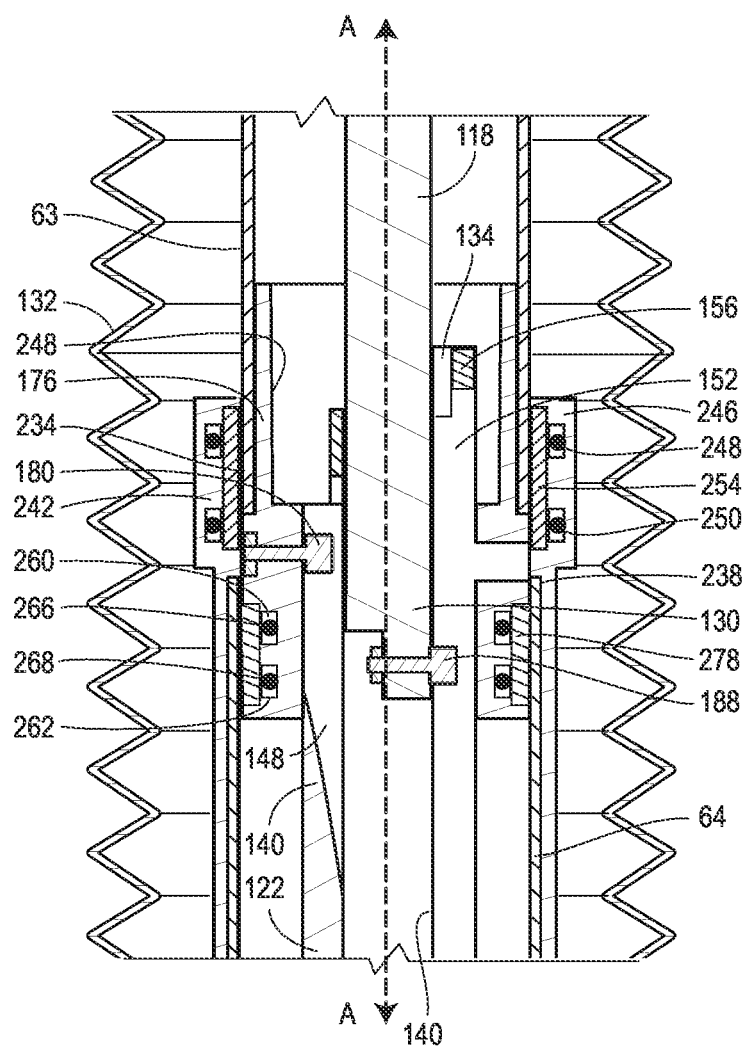
FIG. 10 is a magnified, partial cross-sectional view of the middle portion of the transducer of FIG. 9.

Turning now to FIGS. 9 and 10, the transducer 22 of the feedback assembly 18 is in the extended configuration, where the piston 54 of the actuator 26 is in a second position. In the extended position, and as shown in FIG. 10, the first and second telescoping tubes 63, 64 are spaced from each other such that the first telescoping tube 63 is not disposed within the second telescoping guide 64. Specifically, the second end 234 of the first telescoping tube 63 is axially spaced from the first end 238 of the second telescoping tube 64. In this position, the inner tube guide 176 and the outer tube guide 242 are concentrically aligned. As the transducer 22 moves from the compressed position to the extended position, the second telescoping tube 64 slides relative to the first telescoping tube 63 along the longitudinal axis A of the transducer 22. The outer guide tube 242, which is fixed to the first end of the second telescoping tube 64, is also in a lower position in FIG. 9 relative to the first end 38 of the transducer 22. In the extended position, the inner tube guide 176 is no longer proximal to the second end 46 of the transducer 22 and the second end 136 of the cam 122, and is now proximal to the first end 134 of the cam 122.

FIGS. 9 and 10 best illustrate the first and second pins 180, 188 disposed in the first and second slots 148, 152, respectively, of the cam 122 when the transducer 22 is in the extended position. The first pin 180 extends into a radial bore of the inner tube guide 176 and into the spiral slot 148, and the second pin 188 extends from the second end 130 of the drive rod 118 into the linear slot 152 of the cam 122. FIG. 10 also shows the milled portion 156 of the first end 134 of the cam 122 and depicts how the first and second slots 148, 152 extend into the milled portion 156 to permit removal of the pins 180, 188 and drive rod 118 from engagement with the cam 122.

When the feedback assembly 18 is in its fully extended position, the system 10 is more susceptible to large vibrations. In particular, the center section of the transducer 22, as shown in FIG. 10, is most susceptible because the overlapping of the cylindrical telescoping tubes 63, 64 is minimized. To reduce vibrations of the transducer 22, the feedback assembly 18 is arranged to concentrically align the inner and outer tube guides 176, 242 when the transducer 22 is in its maximum extension. When the inner and outer tube guides 176, 242 are concentrically aligned, the outer tube guide 242 surrounds a portion of the inner tube guide 176. When the tube guides 176, 242 overlap in this way, the most susceptible portion of the transducer 22 is reinforced with four different O-rings 248, 250, 266, 268 and two guide sleeves 254, 278 that help dampen vibrations in the system 10. In other words, the transducer 22 is arranged to concentrate various dampening components in the most susceptible area, which is the middle portion of the transducer 22. The sleeves 254, 278 are composed of a material that absorbs vibrations, such as a polymer, but may be made of other materials.

Figure 11:
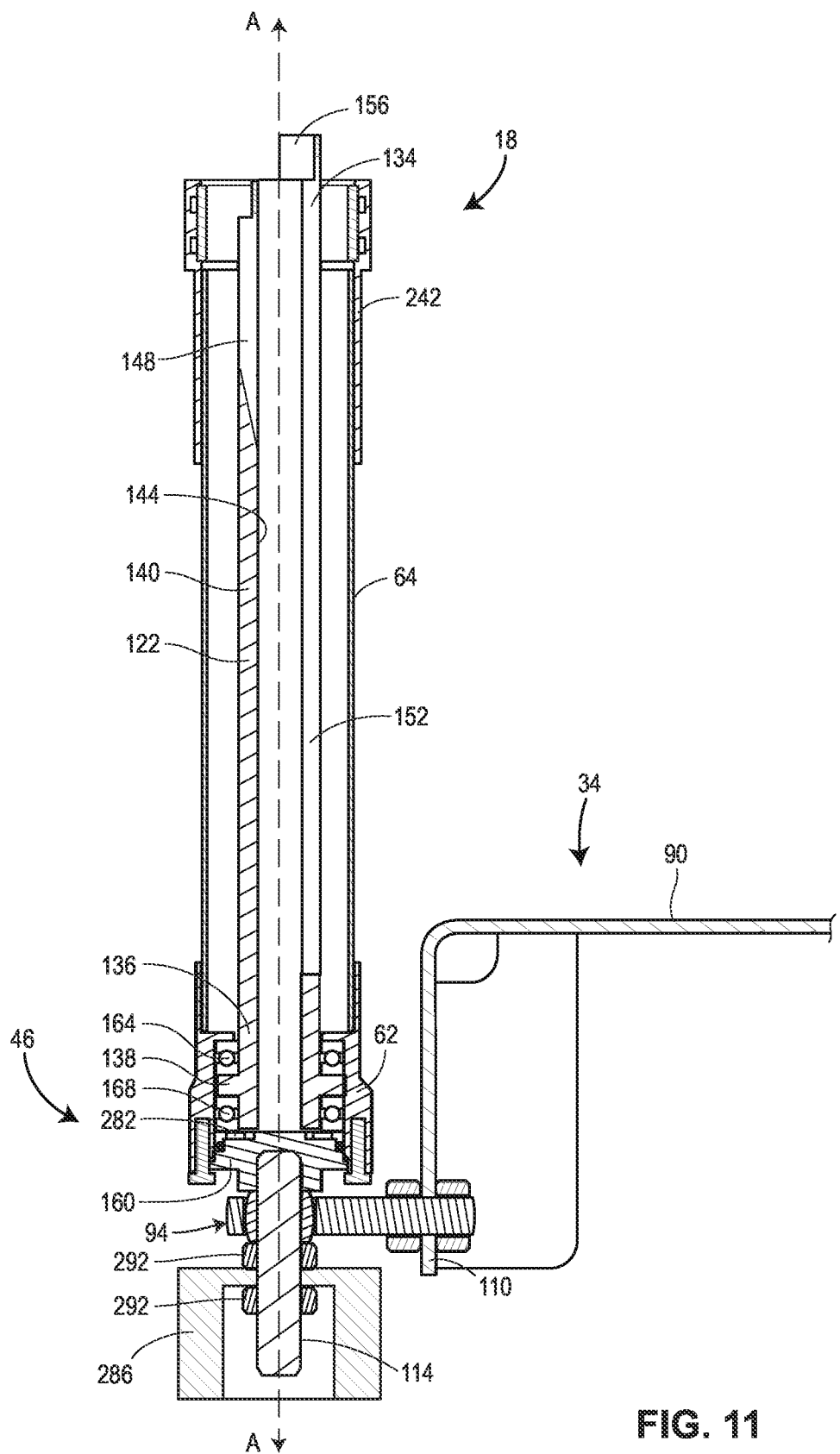
FIG. 11 is a partial, cross-sectional view of a second end of the transducer and a damper constructed in accordance with the teachings of the present disclosure.

In another example, one or more dampers may be installed with the feedback assembly 18 to further reduce vibrations and increase stability of the system 10. FIG. 11 illustrates a first exemplary damper 286 attached at the second end 46 of the transducer 22 and constructed in accordance with the teachings of the present disclosure. The damper 286 is coupled to a distal end of the mounting bolt 114 and adds weight to the system 10 to minimize lateral vibration and shift the center of gravity of the feedback assembly 18. The damper 286 may be tuned by balancing the mass 286 around the second mounting assembly 34, and in particular, to balance the mass of the transducer 22 about the ball joint 94. The mass of the damper 286 may be increased for transducers with longer travel distances. Fine tuning the mass distribution may be made by adjusting location of the damper 286 with first and second damper adjustment nuts 292. In this way, mass placement may be determined and corrected in the field.

Figure 12:
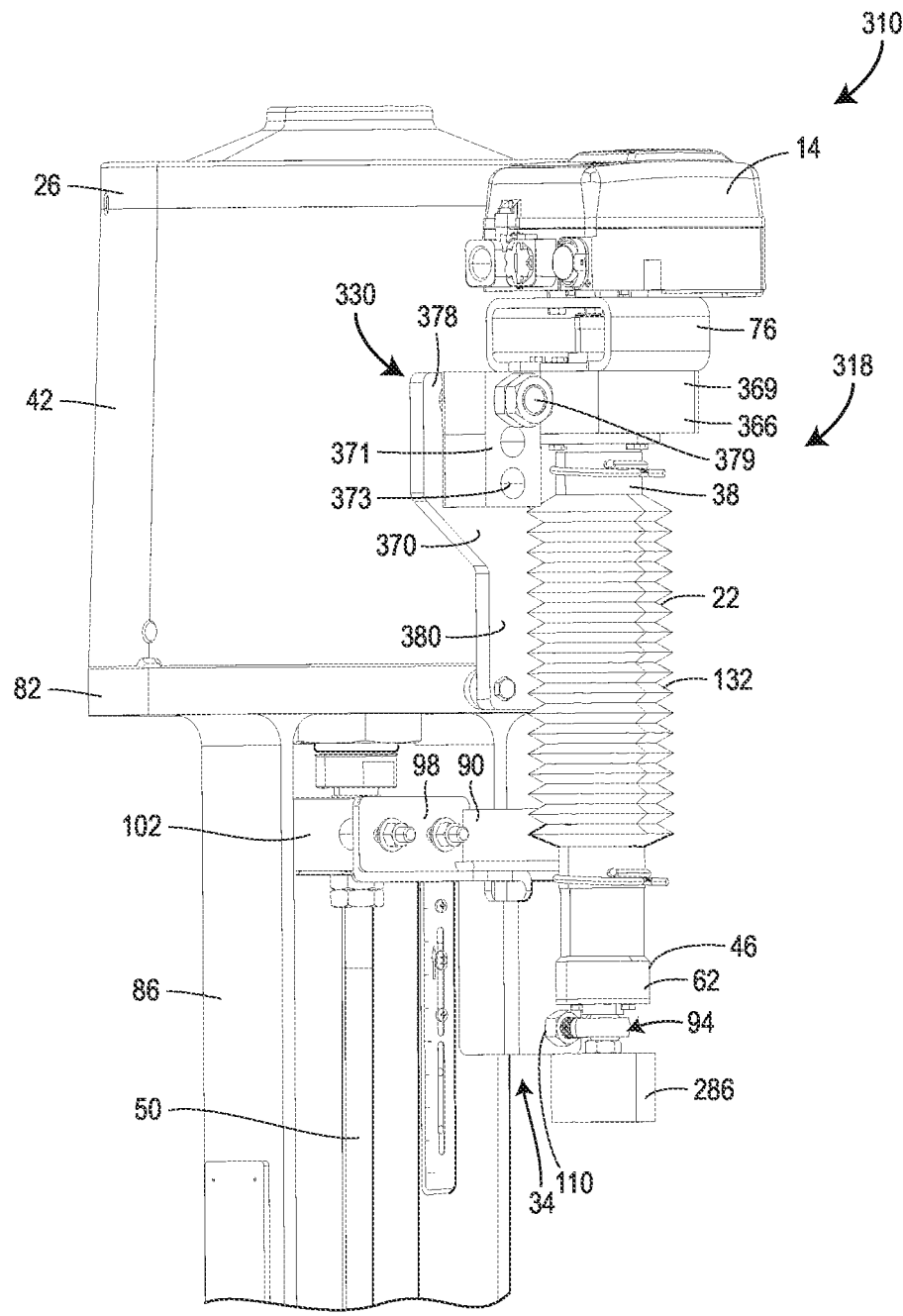
FIG. 12 is a back perspective view of a second exemplary travel feedback system constructed in accordance with the teachings of the present disclosure.

In another example, FIG. 12 illustrates a second exemplary feedback system 310 constructed in accordance with the teachings of the present disclosure. The feedback system 310 is similar to the feedback system 10 of FIGS. 1-10 described above, with the same reference numerals used for similar components, but has a slightly different first mounting assembly 330. It will be appreciated that a feedback assembly 318 of FIG. 12 operates in the same manner as the feedback assembly 18 of FIGS. 1-10. However, the first mounting assembly 330 of FIG. 12 provides a variation of a bracket tube 366. In particular, the bracket tube 366 includes a horizontal component 369 mounted between the DVC mount 76 and the first end 38 of the transducer 22. The bracket tube 366 also includes a vertical component 371 that couples the horizontal component 369 of the tube bracket 366 to a pin bracket 370. The vertical component 371 includes three, vertically aligned apertures 373 sized to receive a pin 379 of the pin bracket 370. By providing multiple apertures 373, the pin 379 of the pin bracket 370 may be bolted to the tube bracket 366 at three different locations. The mass of the feedback assembly 318 may be balanced around the first mounting assembly 330 by bolting the pin bracket 370 to one of the apertures 373, depending on the needs of the system. When the feedback assembly 318 is installed in the field, an operator may bolt the pin bracket 370 to the aperture 373 that balances the weight of the transducer 22, and therefore dampen vibrations. The mass of the DVC 14, DVC mounting bracket 76, and other components above the pin bolt 379 may counterbalance the mass of the components mounted below the pin bolt 379.

The feedback systems 10, 310 of the present disclosure each provides a ruggedized linear-to-rotary transducer 22 mounted to a DVC 14 for valve travels in excess of eight inches. In particular, the feedback systems 10, 310 may be used with sliding stem control valves, isolation valves, or other linear vales with travel longer than eight inches. This transducer 22 converts linear input from an actuator 26 to rotational output to the positioner, and is capable of operating at high stroke speed (velocities over 100 inches per second) and can withstand high G loads created by the rapid deceleration caused by the valve plug contacting the valve seat. It can be fully sealed from the elements for use in harsh environments. The systems 10, 310 are easy to install and allow for inaccuracies in alignment and rotation when installing without affecting the accuracy of the transducer 22.

The first and second mounting assemblies 30, 34 of the system 10 provide many advantages, and can accommodate installation inaccuracies and may be adapted for use with a variety of different actuators and valve types. The mounting assemblies 30, 34 are tolerant of non-axial actuator travel, such as a small amount of valve stem rotation, while still providing accurate stem position. The first mounting assembly includes the bracket tube that constrains the transducer in all directions except for rotation about the pin bolt. While most sliding stem control valves experience some amount of valve stem rotation when operated, the tube bracket of the first mounting assembly 30 is arranged to tolerate valve stem rotation without causing damage or degrading the accuracy of the travel feedback. Similarly, the ball joint can accommodate both lateral and tilting motion without causing damage or degrading the accuracy of the travel feedback. Additionally, the flexibility in the mounting assemblies can accommodate human mounting errors like misalignment, stem rotation, and tilting or cocking of the mounting brackets. This is because the transducer moves along its own axis, and still operates accurately if disposed at an angle relative to the piston actuator. The tolerance of the mounting imperfections accommodated by the mounting assemblies 30, 34 may be applied with other devices such as louvers, vanes, and sliding doors.

Additionally, the inherent linearity of the feedback assembly 18, 318 facilitates initial setup, field maintenance, and disassembly of the transducer 22. For example, an operator may quickly and easily disassemble the transducer 22 by removing second end 46 of the transducer 22 from second mounting bracket assembly 34, and sliding the second telescoping guide tube 64 out with the outer tube guide 242. The milled features 156 in the first end 134 of the cam 122 allow the pins 180, 188 to slide in or out without interference with the other components of the transducer 22. During disassembly, the pins 180, 188 disengage from the cam 122 allowing the torsion spring 222 to unwind to the neutral position. During reassembly of the feedback assembly 18, 318, the torsion spring 222 can be left in the neutral position without being preloaded. After the pins 180, 188 are engaged in the slots 148, 152 of the cam 122, the torsion spring 222 can be loaded externally by turning the hex collar 196.

The materials of the feedback assemblies 18, 318 also provide additional benefits. For example, the first and second mounting assemblies 30, 330, 34 are constructed using simple, rugged mounting brackets, bolts, and ball joints that are inexpensive, commercially available, and durable. The moving components of the transducer 22 are also sealed from harsh environments by a durable bellows. Further, the components of the transducer 22 may implement lightweight materials such as carbon fiber and aluminum for better vibration performance and use.

Additionally, the feedback assemblies 18, 318 of the disclosed systems 10, 310 accurately communicate linear travel of a control valve, regardless of installation inaccuracies or vibration. For example, the feedback assemblies 18, 318 employ torsion springs and disk springs to help eliminate lost motion in rotary and linear directions, thereby providing accurate readings and transfer of linear travel. Additionally, the transducer 22 separates the twist of a DVC magnet and the twisting of the drive rod 118 so that the DVC does not read undesirable movement the transducer 22 as actuator travel. In one example, the freedom to spin the lower mounting bolt 114 has no effect on the rotation of the magnet of the DVC. Further, because the lower mounting bolt 114 is free to spin, the transducer 22 is protected from wrench torque damage during installation.

The system 10, 310 may also be adapted for a particular travel length, and therefore is scalable to nearly any travel of significant length, for example of travels of eight inches or more. For example, the cam 122 may include additional slots for redundancy and to combat cam wear, and slots of varying lengths to provide different travel extensions or different travel characteristics. The configuration of the slots of the cam may be modified to reduce travel. The spiral slot of the cam may be shorted to allow for only four inches of travel. In this case, the transducer can never fully extend, and therefore the telescoping tubes are never fully separated as shown in FIG. 9. Additionally, the arc of curvature of the spiral slot of the cam may be altered to allow for the DVC magnet to achieve a full 90 degree rotational span. By utilizing the full 90 degree span of the magnet, the system 10, 310 may improve in accuracy.

In yet another example, a transducer 22 arranged for a certain length of valve travel, for example 12 inches, may be used to with an actuator with a smaller travel length, for example eight inches. By using a transducer 22 capable of longer travels on an actuator that only has a travel of eight inches, the transducer 22 inherently adds more vibration control as the transducer 22 does not fully extend the twelve inches of travel. When the transducer 22 does not fully extend, there is additional overlap between the guides 176, 242, thereby reducing vibration.

The construction of the cam 122 also provides many benefits. Importantly, the engagement of the cam 122 with the drive rod 118 and the pins 180, 188 achieves a simple linear-to-rotary conversion without requiring too many components. Additionally, the cam 122 is constructed to extend its life even in the presence of wear as only one side of each of the cam slots 148, 152 engages with pins 180, 188. By simply reversing the loading direction of the torsion spring 222, the other side of the slots 148, 152 may be used, thereby doubling the wear surfaces of the rotary cam 122. Further, the compact arrangement of the transducer components eliminates any chance of the pins 180, 188 falling out of alignment with the cam 122, which is a common problem with linear cams. Additionally, and as mentioned above, the cam 122 may be altered to achieve a particular travel extension.

Vibration testing of the transducer 22 on an electrodynamic shaker table can be accomplished independently from the actuator structure, whereas traditional integrated positioner feedback systems are dependent on the response (stiffness) of the actuator itself. Verification of vibration performance independent of the equipment on which the feedback system is mounted is advantageous as testing of many equipment combinations is impractical. Lateral motion between the pins 180, 188 and the cam 122 is minimized by the close guiding between the drive rod 118 and the cam 122. For equipment operating for long durations at a single travel in high vibration environments, traditional linear cams often suffer from premature wear in the form of the pin wearing a notch in the cam. Therefore, it is highly advantageous to evaluate this type of cam wear on an electrodynamic shaker table in a laboratory environment, avoiding field failures common to traditional linear cams designs.

Finally, although certain feedback systems 10, 310 have been described herein in accordance with the teachings of the present disclosure, the scope of coverage of this patent is not limited thereto. On the contrary, while the disclosed feedback systems 10, 310 have been shown and described in connection with various examples, it is apparent that certain changes and modifications, in addition to those mentioned above, may be made. This patent application covers all examples of the teachings of the disclosure that fairly fall within the scope of permissible equivalents. Accordingly, it is the intention to protect all variations and modifications that may occur to one of ordinary skill in the art.

What is claimed:

1. A linear feedback travel assembly comprising:
   a first tube end, a second tube end opposite the first tube end, and a longitudinal axis;
   a drive rod including a first end disposed proximal to the first tube end, and a second end opposite the first end;
   a cam including a first end, a second end opposite the first end and disposed within the second tube end, and a wall defining a bore, a first slot, and a second slot, the bore sized to slidably receive the drive rod, the cam being movable along the longitudinal axis and rotatable about the longitudinal axis when the second tube end receives a linear input;
   a first pin movably disposed in the first slot of the cam, the first pin fixed relative to the first tube end;
   a second pin movably disposed in the second slot of the cam and connecting the second end of the drive rod to the cam; and
   wherein when the cam linearly moves along the longitudinal axis, the first pin moves within the first slot of the cam and rotates the cam about the longitudinal axis, the second pin rotates the drive rod as the second pin moves within the second slot of the cam.

2. The assembly of claim 1, wherein the first slot is a spiral slot and the second slot is a linear slot.

3. The assembly of claim 1, further comprising a first mounting assembly coupled to the first tube end, the first mounting assembly arranged to couple a housing of an actuator assembly to the first tube end.

4. The assembly of claim 3, further comprising a second mounting assembly coupled to the second tube end, the second mounting assembly arranged to couple a stem connected to an actuator assembly to the second tube end so that the second mounting assembly is movable in a linear direction with the stem.

5. The assembly of claim 4, wherein the second mounting assembly includes a ball joint coupled to the second tube end.

6. The assembly of claim 5, further comprising a damper disposed adjacent to the ball joint.

7. The assembly of claim 1, further comprising a first telescoping tube slidably coupled to a second telescoping tube, the first telescoping tube coupled to the first tube end and the second telescoping tube coupled to the second tube end.

8. The assembly of claim 7, further comprising a guide tube mounted to the first telescoping tube, the first pin extending from the guide tube and into the first slot of the cam.

9. The assembly of claim 1, further comprising a digital valve controller coupled to the first end of the drive rod to receive a rotational output of the drive rod.

10. The assembly of claim 1, further comprising a bellows having a first end sealably coupled to the first tube end and a second end sealably coupled to the second tube end.

11. A linear travel feedback system comprising:
    a transducer having a first end and a second end opposite the first end, the transducer including a drive rod and a cam coaxially aligned relative to a longitudinal axis of the transducer, the drive rod including a first end proximal to the first end of the transducer and a second end opposite the first end, and the cam including a first end and a second end opposite the first end, wherein the second end of the cam is coupled to the second end of the transducer;
    a first mounting assembly arranged to couple the first end of the transducer to an actuator housing;
    a second mounting assembly arranged to couple the second end of the transducer to a stem so that the second mounting assembly is movable with the stem;
    wherein the transducer is movable between a compressed position, in which the second end of the drive rod is proximally located relative to the second end of the cam, and an extended position, in which the second end of the drive rod is spaced from the second end of the cam.

12. The system of claim 11, wherein the cam is rotatable about the longitudinal axis and linearly movable along the longitudinal axis as the transducer moves between the compressed position and the extended position.

13. The system of claim 11, wherein the cam is movable relative to the drive rod and includes a wall defining a bore, a spiral slot, and a linear slot, the bore sized to slidably receive the drive rod.

14. The system of claim 13, further comprising a first pin movably disposed in the spiral slot of the cam, the first pin fixed relative to the first end of the transducer.

15. The system of claim 14, further comprising a second pin movably disposed in the linear slot of the cam and connecting the second end of the drive rod to the cam.

16. The system of claim 11, further comprising a first telescoping tube and a second telescoping tube movable relative to the first telescoping tube, the second telescoping tube movable along the longitudinal axis when the transducer moves between the compressed position and the extended position.

17. The system of claim 11, wherein the first mounting assembly includes a tube bracket and a pin bracket coupled to the tube bracket, the tube bracket coupled to the first end of the transducer and the pin bracket arranged to couple the tube bracket to a yoke of the actuator assembly.

18. The system of claim 11, further comprising a digital valve controller coupled to the first end of the drive rod to receive a rotational output of the drive rod.

19. A method of determining linear travel of an actuator, the method comprising:
mounting a first end of a transducer to an actuator housing of an actuator assembly, the transducer including a cam, a drive rod, a first pin coupled to a spiral slot in the cam, and a second pin coupling the drive rod to a linear slot of the cam, the drive rod and cam aligned with a longitudinal axis of the transducer;
mounting a second end, opposite the first end, of the transducer to a stem connected to the actuator assembly, the stem movable relative to the actuator housing in a linear direction, the transducer movable with the stem between a compressed configuration and an extended configuration along the longitudinal axis;
coupling a digital valve controller to the transducer;
receiving, via the second end of the transducer, a linear input from the stem when the stem moves a distance in the linear direction, the second end of the transducer coupled to the cam;
transferring the linear input from the stem to the cam, the cam axially movable along the longitudinal axis;
converting the linear input of the stem to a rotational output of the cam, the first pin rotating the cam about the longitudinal axis when the cam moves linearly along the longitudinal axis;
receiving, via the drive rod, the rotational output of the cam;
converting the rotational output of the cam to a rotational output of the drive rod, the second pin rotating the drive rod about the longitudinal axis when the second pin moves relative to the linear slot of the cam;
receiving, via the digital valve controller, the rotational output of the drive rod; and
measuring the distance of the stem using the rotational output of the drive rod.

20. The method of claim 19, wherein mounting a second end includes coupling a ball joint to a bracket, and coupling the bracket to the stem.

* * * * *

UNITED STATES PATENT AND TRADEMARK OFFICE
CERTIFICATE OF CORRECTION

| | |
|---|---|
| PATENT NO. | : 11,536,393 B2 |
| APPLICATION NO. | : 17/228262 |
| DATED | : December 27, 2022 |
| INVENTOR(S) | : Michel K. Lovell |

It is certified that error appears in the above-identified patent and that said Letters Patent is hereby corrected as shown below:

In the Specification

At Column 1, Line 35, "Often times," should be -- Oftentimes, --.

At Column 3, Line 51, "from," should be -- form, --.

At Column 7, Line 13, "a an" should be -- an --.

At Column 7, Line 27, "rotates" should be -- rotate --.

At Column 12, Line 49, "movement" should be -- movement of --.

At Column 13, Line 6, "to with" should be -- with --.

Signed and Sealed this
Tenth Day of December, 2024

Katherine Kelly Vidal
*Director of the United States Patent and Trademark Office*